United States Patent
Cunico

(10) Patent No.: US 9,022,150 B2
(45) Date of Patent: May 5, 2015

(54) WIND GENERATOR SYSTEM FOR ELECTRIC VEHICLES

(76) Inventor: Michele Cunico, Rome (IT)

(*) Notice: Subject to any disclaimer, the term of this patent is extended or adjusted under 35 U.S.C. 154(b) by 0 days.

(21) Appl. No.: 13/811,941

(22) PCT Filed: Sep. 7, 2011

(86) PCT No.: PCT/IT2011/000311
§ 371 (c)(1),
(2), (4) Date: Jan. 24, 2013

(87) PCT Pub. No.: WO2012/032556
PCT Pub. Date: Mar. 15, 2012

(65) Prior Publication Data
US 2013/0146372 A1   Jun. 13, 2013

(30) Foreign Application Priority Data

Sep. 7, 2010 (IT) .............. RM2010A0471
Jul. 5, 2011 (IT) .............. RM2011A0350

(51) Int. Cl.
*B60K 16/00* (2006.01)
*B60L 8/00* (2006.01)
*B60L 9/00* (2006.01)
*B60L 11/18* (2006.01)
*F03D 1/04* (2006.01)
*F03D 3/02* (2006.01)
*F03D 3/04* (2006.01)

(52) U.S. Cl.
CPC ....... *B60L 11/1809* (2013.01); *B60K 2016/006* (2013.01); *B60L 8/006* (2013.01); *F03D 1/04* (2013.01); *F03D 3/02* (2013.01); *F03D 3/0427* (2013.01); *F05B 2220/708* (2013.01); *F05B 2240/133* (2013.01); *F05B 2240/941* (2013.01); *Y02E 10/72* (2013.01); *Y02E 10/74* (2013.01); *Y02T 10/7083* (2013.01)

(58) Field of Classification Search
USPC .............. 180/2.2, 2.1, 167, 168, 65.1
See application file for complete search history.

(56) References Cited

U.S. PATENT DOCUMENTS

| 4,168,759 | A | * | 9/1979 | Hull et al. ............ 180/2.2 |
| 5,280,827 | A | * | 1/1994 | Taylor et al. .......... 180/165 |
| 6,700,215 | B2 | * | 3/2004 | Wu ................... 290/44 |
| 6,898,575 | B2 | * | 5/2005 | Mull .................. 705/39 |

(Continued)

FOREIGN PATENT DOCUMENTS

| DE | 32 01 555 A1 | 2/1984 |
| EP | 1 108 890 A2 | 6/2001 |

(Continued)

OTHER PUBLICATIONS

International Search Report, Feb. 2, 2012, from International Phase of the instant application.

*Primary Examiner* — Hau Phan

(57) ABSTRACT

The present invention regard an improvement for the electric car object of the patent for industrial invention n. 0001389629, Italian, title "electric car" name: Cunico Michele application n. RM2010A000115, dep. Sep. 4, 2008, Particularly the present invention improves the efficiency and the reliability of the complex constituted by the guide of the air 16, the wind generator 4 and relative structures of support, introducing some valves in the element of guide of the air 16. It also allows the car to acquire energy from the back and side wind by providing of channels empty equipped with wind generator that cross transversally the car.

3 Claims, 4 Drawing Sheets

(56) References Cited

U.S. PATENT DOCUMENTS

| | | | |
|---|---|---|---|
| 7,135,786 B1 * | 11/2006 | Deets | 290/55 |
| 7,641,005 B2 * | 1/2010 | Cong | 180/2.2 |
| 7,802,641 B2 * | 9/2010 | Friedmann | 180/2.2 |
| 2005/0098361 A1 * | 5/2005 | Mitchell | 180/2.2 |
| 2006/0113118 A1 | 6/2006 | Kim | |
| 2010/0026009 A1 | 2/2010 | Sarwin | |
| 2010/0122858 A1 | 5/2010 | Cong | |

FOREIGN PATENT DOCUMENTS

| | | |
|---|---|---|
| FR | 2 879 970 A1 | 6/2006 |
| WO | WO 2006/087139 A1 | 8/2006 |

\* cited by examiner

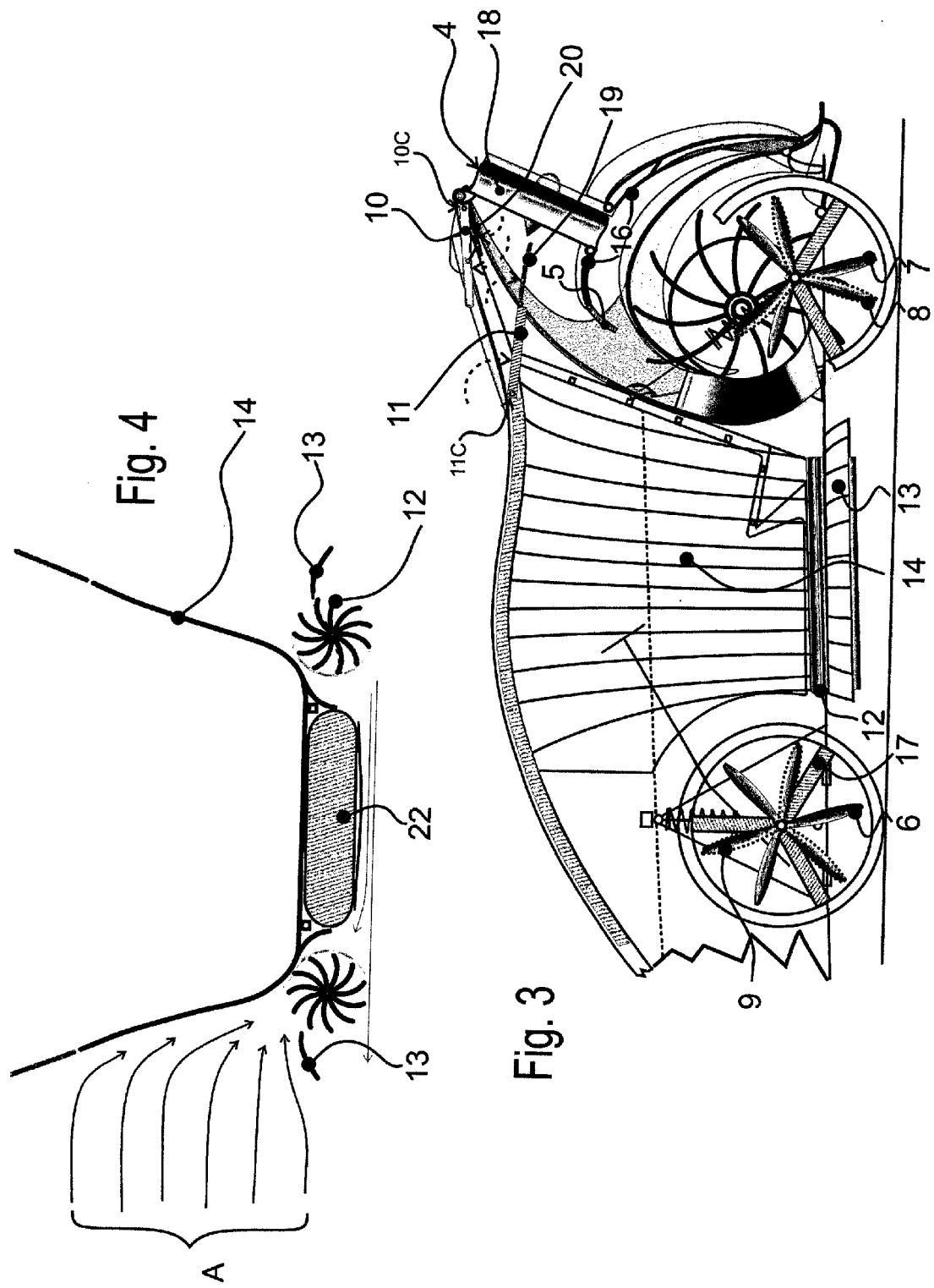

WIND GENERATOR SYSTEM FOR ELECTRIC VEHICLES

TECHNICAL FIELD

The invention which is described is to four-wheel car, not-polluting, driven by an electric engine fed by batteries which draw energy primarily from photovoltaic panels and wind fans.

BACKGROUND ART

There are many patents, since the '60s, that provide wind generators applied to car: they are inserted into the body in place of the radiator, or on the body of a car, or located in Venturi tubes, which crossing inside of the body, or placed in "air intakes", etc. They are designed to absorb energy from the relative wind caused by the motion of the car. In reality, however, if a wind generator applied to a vehicle could produced more energy than itself consumes to move forward in the atmosphere, winning own aerodynamic drag, this would achieve the status of perpetual motion of the first kind, which is impossible, so any wind generator fan applied to moving vehicle absorbs more energy than itself generates, and is therefore disadvantageous its presence to increase the efficiency of the vehicle. The Italian (at my name) patent n. 0001389629 (title "electric car" application n. RM2008A000185 dep. Sep. 4, 2008), instead, offers a system that allow to absorb energy from the slow atmospheric wind, when the car is still, during the parking condition, also if there is another car parked in front of it, by supplying to the fans air in sufficient amount and faster then in atmosphere, at to still condition of the car. (The wind generators is expressly provided in the patent that can be retracted (and off) during the motion of the car as if they were invested by the relative wind, would consume more energy to the vehicle's progress than they generate). To provide the wind generators with a sufficient amount of air working with the fans and a sufficient acceleration of the slow atmospheric wind speed when the car is still in a parking, the entire upper surface of the car, which is larger than the plan of the whole vehicle, is such as to causes this acceleration of the slow speed of the atmospheric wind to increase the efficiency of fans positioned at high the end of the aerodynamic accelerator. At the same time the upper surface of the aerodynamic accelerator presents photovoltaic cells, extended in a surface semi-perpendicular to the sun ray and bigger then the plan of the vehicle, that improve the energy absorbed by the elements.

Over the said wind generator there is a wing that present its own longitudinal ends upward bent (marked by the n.16 FIG. 2—in the drawings attached to such patent). The necessary effect of such bent portions evidently consists in capturing more wind in comparison to what horizontally blow in front of the wind generators and toward them, particularly that portion of the wind that blows on the upper part of the upper extremity of the wind generator and under the upper extremity of the upward bent part of such winglet.

The important elevation of the upward bent extremities of the element 16 (of which in the Italian patent n. 0001389629) to capture more wind, exposes to the risk of a breaking of the same (winglet and frame of the fans) structure in the case of gusts wind or it involves the necessity to make the extremely strong and heavy structure, reducing, as a result, the range of the vehicle.

The innovation, object of the present patent application, solve this problem and improve further the efficient of the described system.

Besides, the present invention realizes the possibility to absorb the slow atmospheric wind that blows in the back (with a generator of great diameter without danger for the passers-by) and sideways to a vehicle conforming to the invention above said in condition of immobile car during the parking.

There are some applications of patents and some prototypes that present wind generator situated in correspondence of the wheels. They propose to absorb energy during the motion of the vehicle from the relative wind and that one produced by the movement of the wheel. however as the status of perpetual motion of the first kind, is impossible, any wind generator fan applied to moving vehicle absorbs more energy than itself generates, because have to win own aerodynamic drag and therefore is disadvantageous its presence to increase the efficiency of the vehicle. The present invention instead realizes the possibility to absorb wind energy during the parking of the vehicle through two channels that cross the car from one side to the other with wind generator situated in the channels that work with the wake of the vehicles that pass nearby to a still car built in accordance with the invention.

BRIEF DESCRIPTION OF THE DRAWINGS the disclosure will be described more fully hereinafter with reference to the accompanying figures, wherein like reference numerals refer to like parts throughout the various views:

FIG. 3 illustrates the same left profile of the car showed in FIG. 1, but with the upper wind generators and the upper guide element of the air retracted;

FIG. 4 illustrates a cross-sectional central view of the car shown in FIG. 1;

DISCLOSURE OF THE INVENTION

Figure 1:
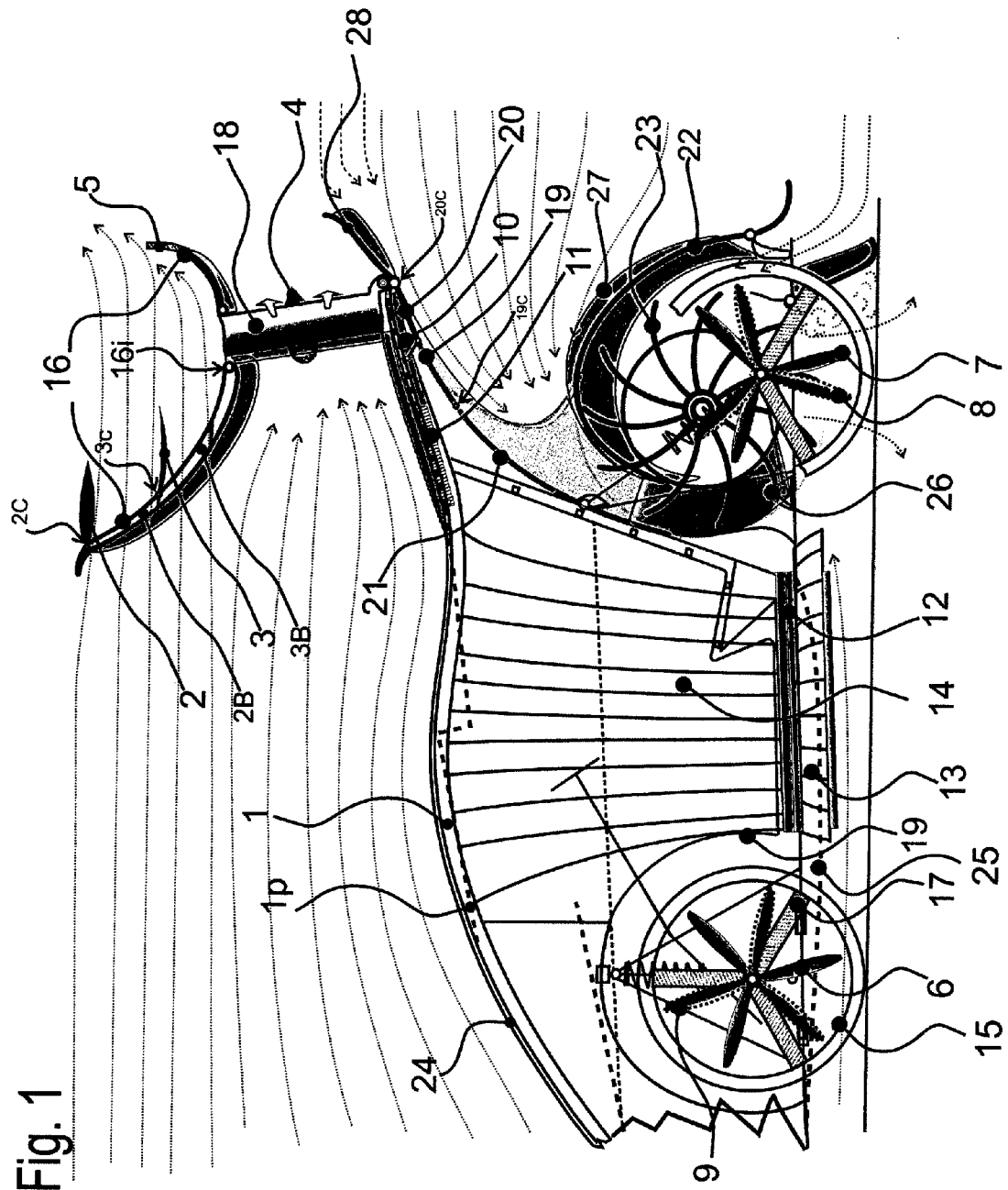
FIG. 1 illustrates the left profile of a car compliant to the invention, according to an example embodiment, having its upper wind generators and its upper guide element of the air, extracted, with the valves of the upper guide element of the air, opened.
Figure 2:
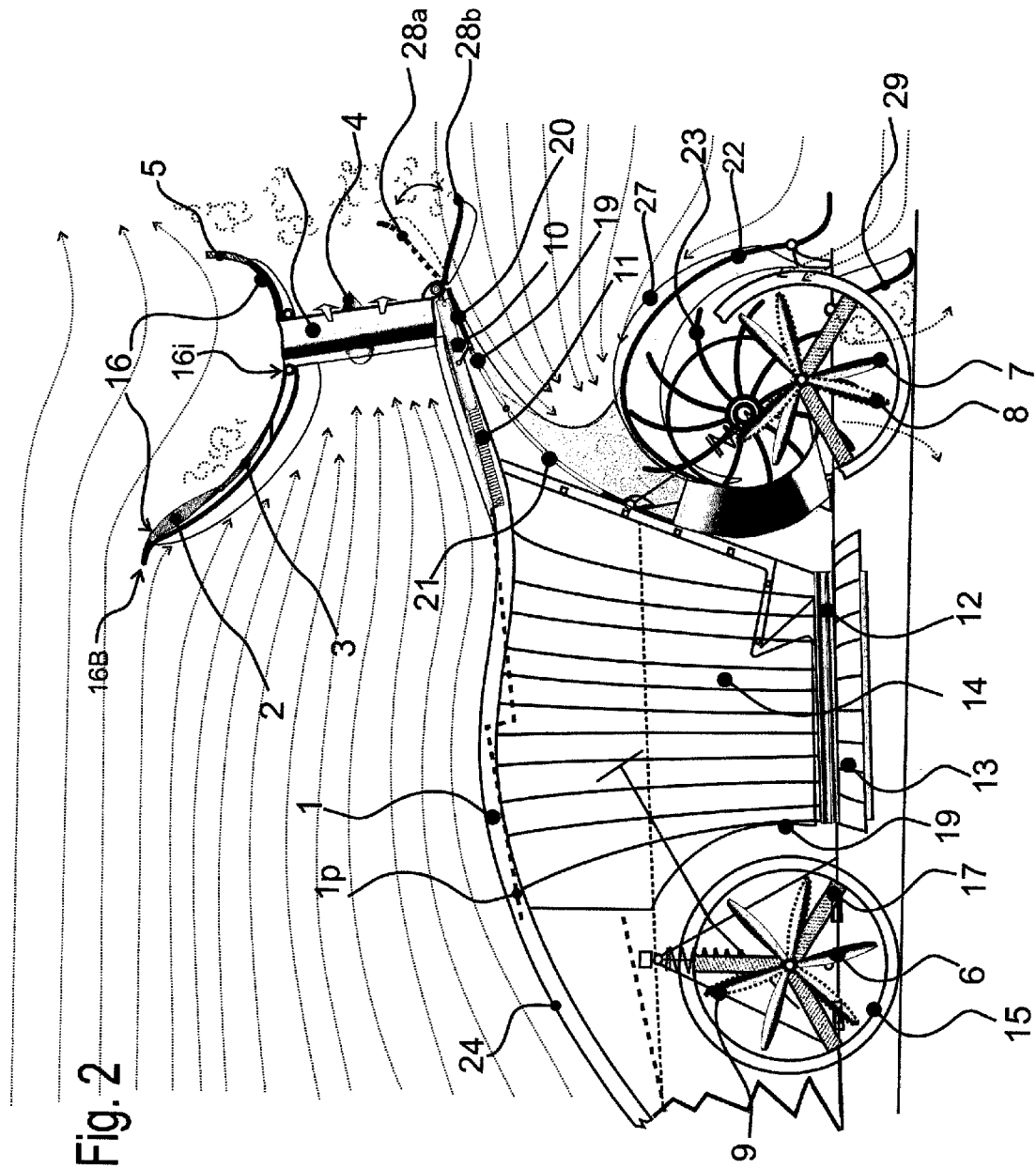
FIG. 2 illustrates the same left profile of the car showed in FIG. 1, but with the valves of the upper guide element of the air, closed.
Figure 5:
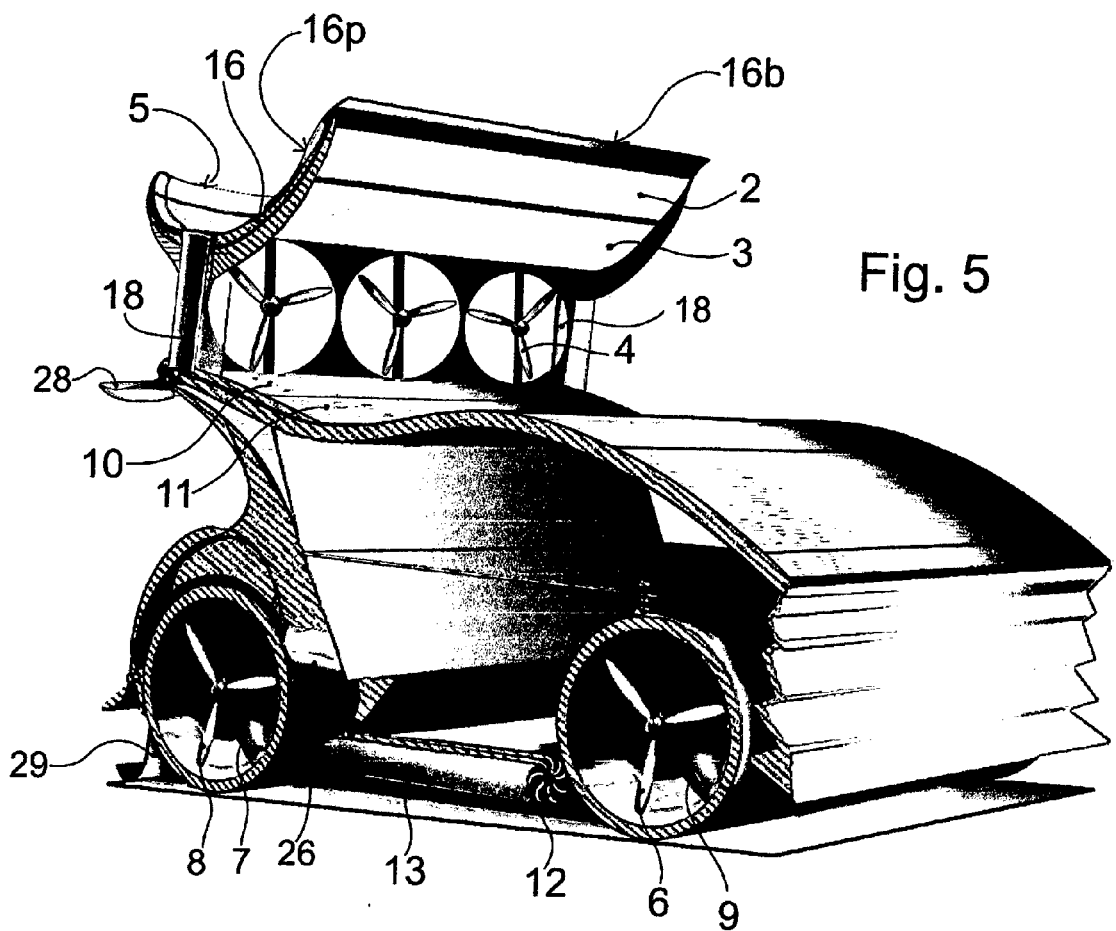
FIG. 5 is a perspective view of a car compliant to the invention, according to an example embodiment, with the upper wind generators and the upper guide element of the air extracted.
Figure 6:
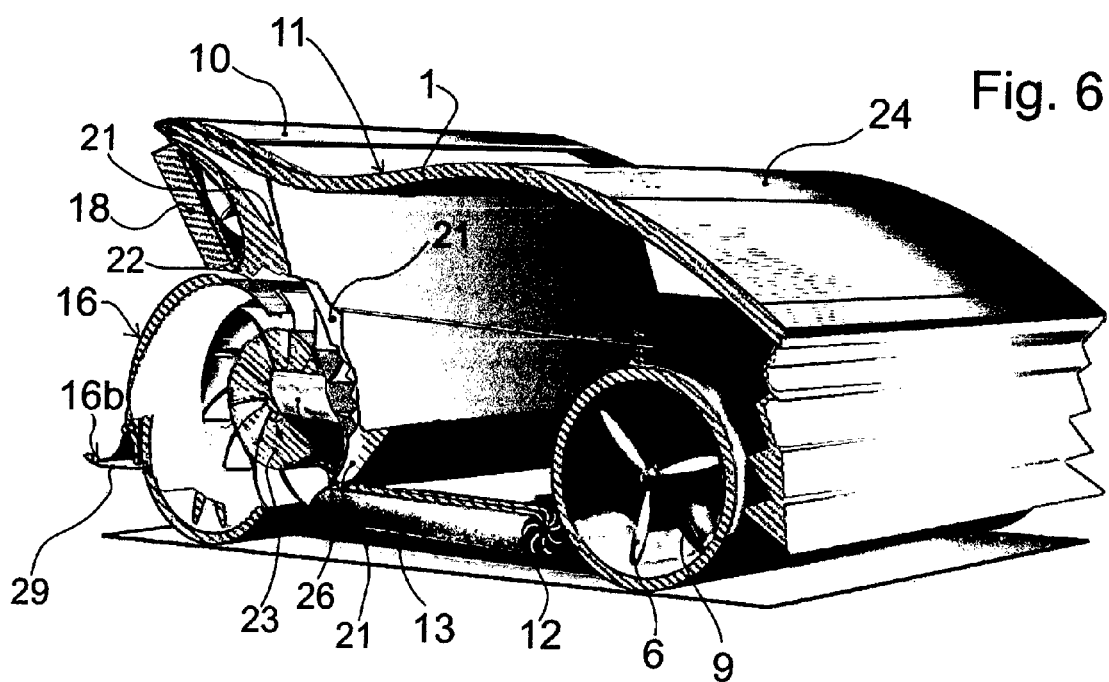
FIG. 6 is a perspective view of the car shown in FIG. 5 with the upper wind generators and the upper guide element of the air retracted and a show-through of the rear part of the car showing the rear lower wind generator.

The drawbacks which have been described above are resolved by the present invention which permits an extension ad libitum of the upward bent extremities of the element 16 without meeting the described drawbacks. It is gotten, according to the invention, for the purposes of which above, through one or more aerodynamic elements (in FIG. 1, 2, 5 are represented two of them) 2 and 3 inserted in holes 2B and 3B, FIG. 1—made in the anterior ascending surface of the element 16 of which they continue the surface. In substance such new elements, constitute portions of the element 16, hinged (in the upper part) in it, detached from it and able therefore to turn around the pivots 2C and 3C. In the position of rest such winglet, that have the function of valves, as shown in FIG. 2, lie along the oblique ascending surface of the deflector 16 being maintained in the housing by its own weight or from spring preferably coaxial with the pivots 2C and 3C and presenting on the opposite extremity, in comparison to that where are the pivots 2C and 3C, a lock that by extending itself over the surface of the winglet 2 and 3 and leaning on the seat constituted by the element 16 same, it prevents the winglet 2 and 3 "to fall" in perpendicular position to the ground. (The invention is not limited to the described example: the elements 2 and 3 can be kept in their housing not only with hinges and teeth, but also with elastic or guides to slide along the surface of the element 16, assisted by spring, or other known elements of retention and movement).

The element 16, that has a "u" shape longitudinal section, presents an anterior upper extremity 16B (FIGS. 1, 2, 5 and 6) concave, that intercepts the slow atmospheric wind and push it by its lower portion downward (of the lower anterior surface of the element 16) feeding the fans 4 with a pressure bigger respect of the atmospheric one and a faster speed of the wind. (Such phenomenon take place in correspondence of the concave (back) part of the element 24, in correspondence of which the flow of the wind that reaches the car from the front, because of the viscosity of the air and the back concavity of the element 24, allowing to pick up the mass of air pushed downward from the element 16 and to address it toward the wind generators 4).

The upper portion of the element 16 B has a convex form that recalls downward, (in the upper surface of the element 16), because of the viscosity of the air, the flow of the wind, delaying the breaking of the the flow of stratum fluid of boundary layer and carry the flow of the wind on the back ascending portion of the element 16 that will move it upward reducing the pressure in the back part of the fans 4 and increasing, for the effect, their efficiency. On the sides of the complex described (element 16, battery of fan 4, their support structure) is placed the deflector 18 that has the function to divert the wind that came from the front, toward the outside of said complex to reduce the pressure behind of the wind generators 4 and to increase their efficiency.

Thanks to the present invention, the element 16 can be very light and wide and able to make to work therefore the fans 4 also under conditions of very weak wind. In the case of strong wind or gusts the elements 2 and 3 pushed by the same wind will lift themselves, as shown in FIG. 1, working as valves operated by the same wind in real time and allowing the wind to cross from side to side the anterior ascending surface of the element 16 that will be therefore not much stressed by the pressure of the gust and it can be light and wide without danger for the physical stamina of the structure constituted by the element of guide of the air 16, the wind generator 4 and relative elements of support. (The elements 2 and 3 represented are 2 but can be arranged only 1 of them as wide as the whole surface of the element 16 supported by i.e. a perimetrical frame, or more than two, smaller. They can also equip the rear ascending part of the 16 element to serve the back wind in the same way as do the front part of the 16 guide of air with the front wind). The anterior ascending portion of the element of guide of the air 16 (but also or only the rear portion symmetrically, if realized in bigger dimension e.g. then the front), is hinged in 16i (FIG. 1) and able therefore to rotate downward, held in the position of job represented in FIG. 1 or 2 from spring or rubber elements known to the state of the technique. In case of gusts wind coming from back direction such front element (winning the resistance of the springs) will turn downward around the hinges 16i reducing its own frontal section in real time and avoiding structural breaking of the anterior portion of the same element 16. Such solution also allows a great compactness of the car body when the complex 16-4 are in retracted position (FIG. 3).

An oblong mirror or chromed element 5 is set in the extremity of the ascending back part of the element 16, on the upper surface of it. This mirror direct the light of the sun on the wide anterior upper ascending surface of the element 16 illuminating it and allowing to have on it the photovoltaic elements that will also work during the exposure of the vehicle with the photovoltaic surface $1p$ in orthogonal position in comparison to the sun. Such photovoltaic surface $16p$ adding itself to the element $1\ p$. (is naturally possible to renounce such characteristic creating the element 16 in transparent plastics to not shade the surface $1p$). The incidence and the profile of the element 16 can be modified with actuators known to the state of the technique to optimize its aerodynamic performances. (The system of retractability of the elements 16 and 4 on the back mudguards of the car are not limited to the shown example: the retraction can result from the setting in other parts of the body of the car of such elements, e.g. they can vertically go down on guides or hinge making join the element 16 on the roof etc., and in working position they not necessarily have to be positioned in the end of the aerodynamic accelerator as is provided by the patent above recalled, but also in other parts of the top of a car).

The present invention offers to the vehicle built in conformity of the patents above recalled the ability to pick up energy from the wind (atmospheric or caused by the circulation of vehicles) that invests sideways the car during the parking. This is achieves, according to the invention, through two great dimensions channels, substantially empty, that transversally cross side by side the car. That channels are created by a complex, constituted by great diameter and empty rims 15, that present a round or elliptic section spoke 17, low profile tire, (with a very thin profile) 31 mudguards 19 that don't present a covering of the wheel in the inside part and a chassis 30 preferably in tubes that in the portion that crosses the channels they present a round or elliptic section or dressed by elements of elliptic section with the greatest diameter of the ellipsis placed in the direction of the length of the described channels. The electric motors, round and of small dimensions, are equipped with ogival fairings aerodynamics placed in the direction of the length of the channels. Such said complex, substantially create two empty channels in transversals position respect to the car, passing inside the two anterior wheels and inside those rear of which the rims represent the extremity. Such channels put in communication the air present in one side of the vehicle with the one present in the opposite side.

The air that is on a side of the vehicle and the air that is on the opposite side, often, don't have the same pressure. It happen when the wind hit sideways the vehicle or in case of passage of vehicles on the road next to a parked car built in conformity of the present invention. It produce a modest increase of the pressure of the air during the approach of the vehicle in transit and then a more important reduction of the atmospheric pressure when the vehicle go away, because of the wake, (i.d. the area of low pressure that follows a vehicle in movement in atmosphere). These two channels, allowing the air to pass from the point of great pressure to that of smaller pressure, they realize a movement of the air into their inside. Said channels are equipped in their internal part with wind generators for which indifferent is the wind direction, (known to the state of the technique) that are operated by the passage of the air through the said two channels, jointed with the hub, or to the frame of the car. Can be also placed in internal part of the channels, wind generators propeller shape, 8, 7 and 6, 9. Such wind generators 8, 7 and 6, 9 are situated so that they not go further the external extremity of the rim to avoid that they are put in movement by the relative wind during the motion of the vehicle producing aerodynamic resistance (because if this should be, for the reasons exposed in pag. 1 of the present act, the wind generator would absorb more energy from the motor of the car then itself would be able to generate, so their presence, in this condition, would be inconvenient to increase the efficiency of the vehicle). The wind generators propeller shape can fixed preferably to a static hub in the center of the wheel (i.e. that its central portion doesn't turn when turn the wheel and keep still during the motion of the vehicle). They can also fixed, not on the static hub but on elements of the chassis or the suspensions of the car, moreover in the case of use of bearing ring that allow the use of completely empty rims. Said wind generators propeller shape, preferably at least two (8 and 7) situated preferably on the same axle, are both able to turn in an only own direction thanks to mechanical systems known to the state of the technique and having the blades with a profile and an incidence optimized for inducing the movement of the two generators respectively: one, only with air that enters the channels from a direction and the other, only with air that crosses the channels by opposite direction. Therefore, one will work only during the approach of the vehicles in speed on the street towards the car in object, and the other only during their getting away, for the reasons above explained. In this way unlike it would happen putting in the channels only one fan propeller shape—, energy is not spent for stopping such fan and then to turn in the opposite direction in every passage of cars in speed near a car conformal to the present invention.

The present invention also creates a system to pick up energy from the wind that hit from the back a conformal car.

Is situated in the rear of the vehicle an aerodynamic element 21 (realized in plastics—metal or material synthetic), of smooth surface that has own upper extremity coincident with the back extremity of the roof. Said smooth surface, is oriented toward the back part of the car and present a transparent portion in correspondence of the rear window of the car, comes downward and ahead in oblique and bent course, inserting itself inside the body of the car behind the back seats. A second aerodynamic element 22 of smooth surface is situated lower down to the first one with its own back lower extremity coincident with the lower back extremity of the body of the car. The lower element 22, move toward the inside of the body surrounding or consisting of the posterior mudguards of the car and then goes down toward the lower part and converges with upper element 21 that comes down oblique from the up. These form together a duct that moves forward and downward inserting itself in the lower part of the body of the car behind the back seats, reducing its own section in own vertical development, accelerating the speed of the wind that hit the car at the back, during the parking, and drive the wind, so accelerated, on an horizontal axle great wind generator contained into the element 22 that faces on the anterior extremity of the said duct.

Said wind generator, that is compatible with a car conformal to that above described and it is added to the other said systems of harvest of wind energy, is situated between the back wheels of the vehicle and it faces its own blades in an opening present in the high anterior part of the same element 22. Such wind generator can be of great dimensions and therefore of relatively great power also measuring more than one meter diameter and it won't involve any danger for the passers-by or the consumers that won't take the risk to be hit from the great blades in rapid rotation in case of strong wind.

said fan (23) is served from a winglet 29 as wide as the space that divides the inside extremities of the back wheels, hinged in the chassis and placed in the back and able to rotate toward the lower part up to touch the ground. It is commanded by tie-rod or electromechanically. Such winglet creates conditions of relative low pressure (the c.d. "wake"), interrupting the flow of the wind that hit the car from the back in correspondence of the area of unloading of the back aerodynamic accelerator that feeds the great wind generator (23). Such winglet pushes part of the wind that hits from the rear the vehicle toward the blades—in coherence with its own sense of rotation—opposite to those hit by the wind made faster by the back aerodynamic accelerator (21 and 22), of the said wind generator 23, increasing the efficiency of it and partly push toward the hollow of the rims as above described.

The present invention also improves the efficiency of the vehicle built in conformity of the patents above recalled in case of described side wind, as following.

The side surface of the vehicle 14 contained between the two side wheels that it includes therefore the doors and the side car windows of the cabin, have an oblique course and particularly, considering the transversal section of the vehicle in that area, it is wider in the up end and narrower in the down end (FIG. 4). This area push downward the wind that hit sideways the described whole surface 14 of the car because such side surface 14 are oblique in the described sense. A wind generator 12 with horizontal axle is situated in the lower extremity of said surface, parallel to the lower extremity of the same surface 14. Said wind generator operated by the air pushed by the wind that sideways strikes the car and diverted by the surface described toward such wind generator 12. A winglet 13, jointed to the frame of the car, is situated in correspondence of the side upper part of such fan generator, as shown in the FIGS. 1, 2, 3 and 4, so it cover the (external) half of the blades of the fan to do that the pushing of the wind interests only a half the blades of the fan. Lower down the blades of the generator 12 will be interested from the wind that moves from opposite direction respect to the described side surface and crosses lower down and transversally the vehicle. Such phenomenon can also be produced by the pressure of the wind produced by a vehicle in approach while the car conformal to the present invention is parked on the side of the roadway. The vehicle in approach, moving the air that has in front of itself, and it will blow, at first, air on the oblique surface 14 described that operate on the blades of the generator 12 and it will inhale air with its wake, after its passage, that will blow on the blades that are in the lower half of the fan 12 preserving the rotation of it.

The present invention also resolves the following problem concerning the vehicle object of the patent above indicated. In such Italian patent n. 0001389629, is provided that the element 1-1p or evidently a parts of it—can be rotated, varying the incidence of it, to increase its efficiency during the parking of the car and to reduce its resistance aerodynamic during the motion of the vehicle.

This involves a substantial mutation of the aesthetics of the vehicle.

A further assignment of the present invention is to allow a reduction of the aerodynamic resistance of the vehicle built in conformity of the application of patent above identified, during the motion, preserving the aesthetical profile of the car.

This we achieves according to the invention, through the division of the back extremity of the elements 1p and 24 in two parts 10 and 11 hinged in 10C and 11C with the element 1, and of the element 21 in two parts 19 and 20 hinged in 19C and 20C (FIG. 1) able to rotate around said hinge being commanded by the cabin through tie-rod or electromechanically. The portions 10 and 11 of the element 1p and the portions 19 and 20 of the aerodynamic element (21) back described, during the motion of the vehicle they are rotated, as shown in FIG. 3, up to assume the position shown in FIG. 3, that it allows the flow out of the same relative wind that the vehicle meets during the motion, reducing the aerodynamic resistance of the car and preserving the aesthetical profile of the same car. When the vehicle is still, together to the extraction of the back complex above described (winglet 16, wind generator 4; relative elements of support), the elements 10, 11, 19 and 20, rotate on the hing returning to occupy the position shown in FIG. 1 and FIG. 2 to serve the wind generators 4 and the fan 23 situated between the back wheels behind the cabin.

The Italian patent n. 0001389629 provide that the photovoltaic cells are covered by a protective crystal 24. In the present invention the photovoltaic cells 1$p$ are not jointed with the protective glass 24 on the whole surface of it, to improve the "orthogonality" respect to the sun.

BEST WAY TO REALISE THE INVENTION

The most economical method to put the invention into practice is that represented graphically in the designs with to frame of steel tubes. Created To elements 1$p$ of the roof, it would be preferable to use photovoltaic panels, elements already on the market, and therefore with the photovoltaic cells already located and connected to panels already provided with anti-hail protection and supported by an aluminum structure, with the aim of reducing production costs.

The invention claimed is:

1. A wind generator system for electric vehicles, comprising:
    an electric car provided with an oblique concave-convex windshield-roof complex, with its front end down and its rear end upward;
    one or more retractable wind generators, supported by a frame, located in the high rear end of said concave-convex oblique windshield-roof complex;
    a guide element of the air, to guide the wind toward the wind generators, having its longitudinal profile U-shaped, with two ascending surfaces: one front and one rear, its upper surface concave, its lower surface convex and its lower end jointed on the top of said wind generators, being said guide element of the air retractable with said wind generators;
    one or more holes cut through the ascending surfaces of the said guide element of the air;
    one or more valves, having the same profile of the ascending surfaces of the guide element of the air, plug, in their rest position, said holes and are opened by the strong wind pressure that pushes from the front or the rear direction of the car, horizontally, on the ascending surfaces of the guide element of the air, where the valves are located;
    said guide element of the air split transversely in its lower end in two portions, both with their lower end hinged on the top of the frame of said wind generators and both held up by spring elements and able to rotate downward if pressed from their upper surface by a gust of wind that crosses the said valves opened in the opposite portion;
    said guide element of the air being its longitudinal profile U-shaped, has its upper surface concave and its lower surface convex while its upper ends bent in opposite way with their lower surface concave and their upper surface convex;
    two vertical deflectors located on the sides of said wind generators.

2. A wind generator system for electric vehicles according to claim 1 further comprising:
    a great diameter hollow rims, that have a round section spokes;
    a thin tires profile;
    mudguards that don't cover the wheel in their inside part;
    a chassis, that in the transversally portion between the wheels presents only tubes in a round or elliptic section;
    wind generators, located in the internal part of said rims, with a blades profile that works in both the wind directions that cross the internal part of said hollow rims transversally from one side to the other or optimized to turn only with air that enters the rims from one direction.

3. A wind generator system for electric vehicles according to claim 1 further comprising:
    two aerodynamic elements: one upper and one lower, both as wide as the car, with their working surfaces facing towards the rear of the car, the upper one has its upper end jointed with the rear high end of the roof; the lower one has its lower end jointed to the rear lower extremity of the car;
    the working surface of said upper aerodynamic element go down and forward, entering into the car;
    the working surface of said lower aerodynamic element surrounds the rear wheels,
    said two aerodynamic elements forming together a duct that moves forward and downward, inserting itself into the lower part of the body of the car behind the back seats, reducing its section;
    an horizontal axle wind generator, situated between the back wheels of the vehicle, is covered by the said lower aerodynamic element, and puts out its blades in an opening in the surface of the lower aerodynamic element;
    two symmetric deflectors located in the side of the duct collect the air from the lateral limit of the car towards the said wind generator.

\* \* \* \* \*